May 18, 1926.
R. C. BENNER ET AL
1,585,073
STORAGE BATTERY AND EXPANSIBLE ACTIVE MATERIAL SUPPORT THEREFOR
Filed Sept. 8, 1922      2 Sheets-Sheet 1
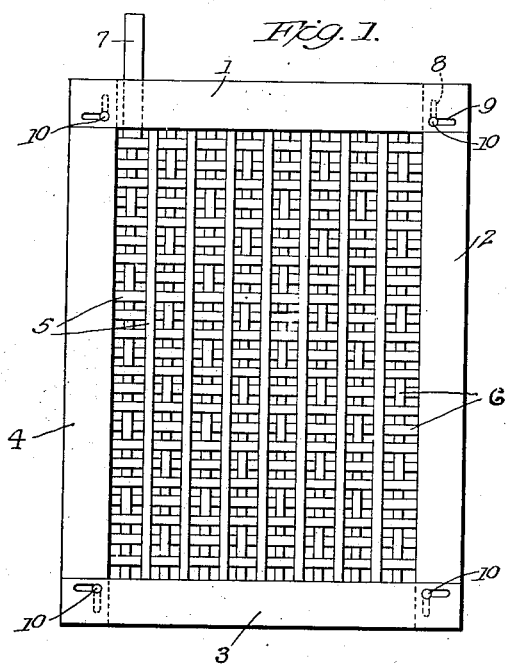
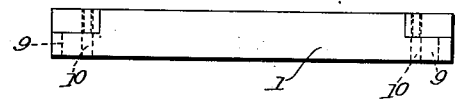
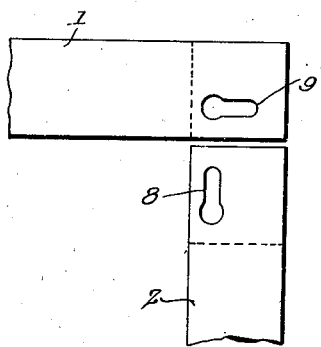
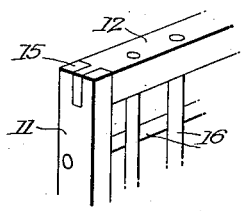
Inventors:
Raymond C. Benner,
Harry H. Thompson,
By Byrnes, Townsend & Brickenstein,
Attorneys.

May 18, 1926.
R. C. BENNER ET AL
1,585,073
STORAGE BATTERY AND EXPANSIBLE ACTIVE MATERIAL SUPPORT THEREFOR
Filed Sept. 8, 1922    2 Sheets-Sheet 2
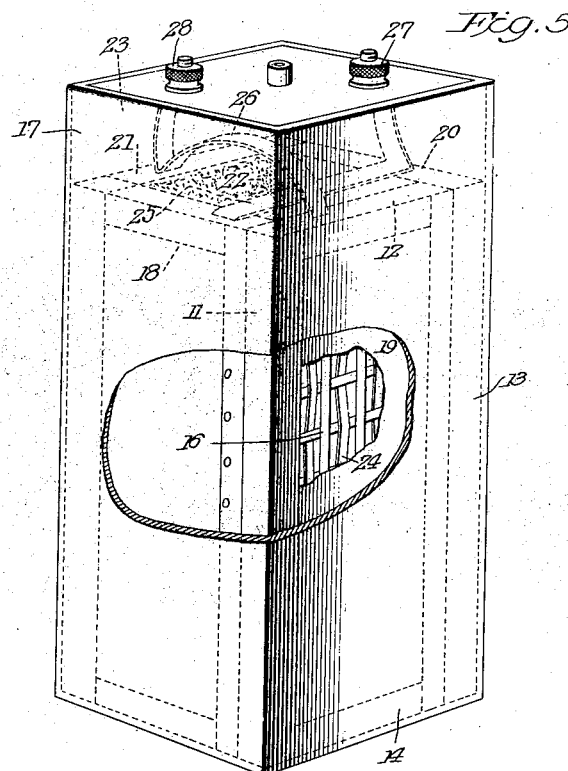
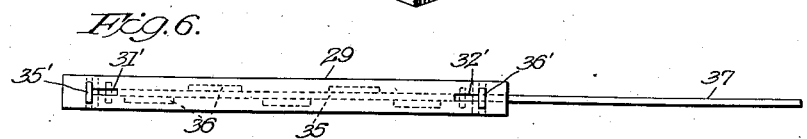
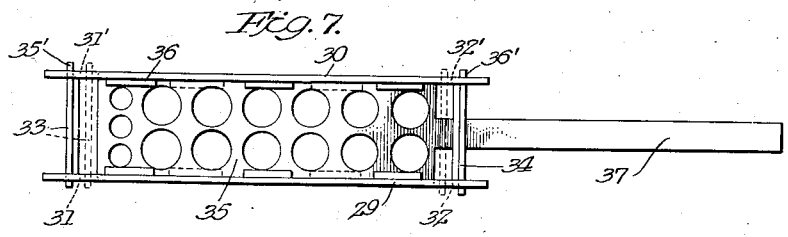
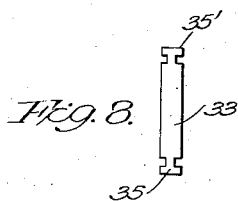
Inventors:
Raymond C. Benner,
Harry H. Thompson,
By Byrnes, Townsend & Brickenstein
Attorneys.

Patented May 18, 1926.

1,585,073

UNITED STATES PATENT OFFICE.

RAYMOND C. BENNER, OF BAYSIDE, AND HARRY H. THOMPSON, OF FLUSHING, NEW YORK, ASSIGNORS TO THE PREST-O-LITE COMPANY, INC., A CORPORATION OF NEW YORK.

STORAGE BATTERY AND EXPANSIBLE ACTIVE-MATERIAL SUPPORT THEREFOR.

Application filed September 8, 1922. Serial No. 586,954.

This invention relates to storage cells and batteries, and particularly to supports for the active materials of such devices. One of the principal objects of the invention is to provide improved supports so formed that they may expand in one or more directions. The constructions described herein are especially adapted for use in the manufacture of non-metallic grids, frames, or the like, for light weight storage cells of the type adapted for use in hand lamps or other battery-operated devices.

The supports of wood or other non-conductive substance heretofore proposed for receiving active material have a relatively low tensile strength and are therefore frequently split or distorted by the swelling of the material, especially during charge. In accordance with the present invention this defect is overcome by providing a frame jointed so as to permit sufficient freedom of expansive movement to counteract the disruptive force of the swelling active material.
Reference is to be made to the accompanying drawings, in which Fig. 1 is a side elevation of an expandible support or grid;

Fig 2 is a top plan view of the same;
Fig. 3 is a detail showing the cooperating slots;

Fig. 4 is a fragmentary perspective view of a modified form of the invention;

Fig. 5 is a perspective view, partly broken away, showing a battery containing supports of the type illustrated in Fig. 4;

Fig. 6 is a side elevation of a further modified form of support;

Fig. 7 is a plan view of the device of Fig. 6; and

Fig. 8 is a detail showing the key member forming part of the device of Figs. 6 and 7.

In the drawings (Figs. 1 and 2), reference numerals 1, 2, 3, and 4 indicate the sides of a frame made of wood or other suitable material. Vertical and horizontal strips or rods 5 are socketed, preferably rather loosely, in the sides of the frame. Wooden rods are suitable. Lead strips 6 are interlaced with the rods and serve to form a good condutive path to terminal 7.

In order to permit expansion of the frame, the lapped corners of frame members 1, 2, 3 and 4 are provided with slots 8 and 9, at right angles, which cooperate with pins 10. For example, the pin 10 inserted through the alined ends of slots 8 and 9, at the junction of sides 1 and 2, may be forced upwardly in slot 8 or laterally in slot 9 in accordance with movements of the sides. The motion permitted by the travel of the pin in the slot will be ample under all ordinary circumstances to compensate for increase in bulk of the active material.

Slots 8 and 9 are preferably made with alined circular portions of slightly larger diameter than that of the pin, but with their remaining portions narrowed. This construction avoids looseness during the handling and pasting of the grid. The pressure exerted by the expanding active material, however, is sufficient to force the pins along the slots.

Figs. 4 and 5 illustrate a modification in which the frame sides 11, 12, 13, 14 are connected by the mortise joints 15. Bamboo rods 16 are preferably used in making the lattice within the frame. The mortise jointing, and the socketing of rods 16 in the frame, are sufficiently tight to prevent looseness under ordinary conditions but these connections will yield to the proper extent under pressure.

The expansible active material supports just described may be assembled in any desired manner to form a cell or battery. The assembly illustrated in Fig. 5 is advantageous. In a casing 17 of square cross section the four supports 18, 19, 20, and 21 are placed in the manner shown. The supports should fit into the casing rather loosely, to permit expansion. Electrolyte absorbent 22 is packed into the central space defined by the supports and holds them in juxtaposition to the casing walls. The casing 17 is preferably somewhat longer than the supports, providing an upper chamber 23 which may be packed with an absorbent.

The casing may be made of any suitable material, but hard rubber is generally preferable. As the absorbent we prefer to use a mixture of fibrous inorganic material, especially glass wool, and an absorptive organic material, as described in the application of R. C. Benner, Serial No. 552,834, filed April 11, 1922.

Supports 18, 19, 20, and 21, preferably jointed as shown in Fig. 4, carry lead strips 24 interlaced with rods 16, or are provided with other suitable conductive means. Supports 18 and 20 are shown as carrying active material of the same polarity and are connected by a conductor strip 25; supports 19 and 21 are of the opposite polarity and are connected by strip 26. Terminals 27 and 28 are connected respectively to extended portions of strips 25 and 26.

Batteries of the type shown in Fig. 5 are characterized by simplicity of assembly, light weight, and the exposure of relatively large active material areas to the action of the electrolyte. They give efficient service and their deterioration while on shelf is slow, owing largely to the fact that local action is substantially prevented by the disposal of the conductor strips completely beneath the surface of the active material. The freedom of expansion possessed by the individual supports makes the assembly immune to the usual deterioration from splitting, buckling, and the like.

In the form of the invention shown in Figs. 6, 7, and 8, strips 29 and 30, preferably formed from celluloid, are provided with alined pairs of slots 31, 31', 32, 32'. Strips 29 and 30 are adapted to form the sides of the support and are held in the proper spaced relation by cross-pieces 33 and 34 at each end of the strips. Each cross-piece is narrowed near the ends to form the key members 35, 35', 36, 36'. The support is assembled by inserting the cross-pieces through alined slots 31, 31', 32, 32', then turning the cross-pieces so that the key members lie at right angles to the slots. Figs. 6 and 7 show in dotted lines the initial position of the cross-pieces 33 and 34, and in full lines the position to which they may be moved by expansion of the active material. The resiliency of the celluloid side strips 29 and 30 permits lateral expansion without damage to the support.

A perforated sheet lead conductor 35, or other suitable conductive means, is placed in the support and is retained by blocks 36 secured to the frame strips. Terminal 37 is connected to conductor 35.

We are aware that metallic grids have been provided with flexible partitions or split frames to permit expansion. Our invention is distinguished from these prior constructions by the provision of frames, preferably of non-conductive material, with movable side members. Light weight grids characterized by substantial freedom from splitting, distortion, or the like, are thus produced, and improved cell and battery assemblies are made possible. The invention is not restricted to the specific embodiments shown as preferred forms herein, and various alternative arrangements fall within the scope of the appended claims.

We claim:

1. An active material support comprising non-conductive frame members supporting the active material and connected to permit movement outward by the expansion of the active material.

2. An active material support comprising frame members, said members having alined slots and a member passing through the slots and adapted to be moved by the expansion of the active material.

3. An active material support comprising frame members, said members having coincident portions provided with slots alined at least in part, and pins passing through the alined portions of said slots and movable along a further portion of said slots by pressure exerted upon the frame members by expansion of the active material.

4. An active material support comprising strips lapped terminally to form a frame, each of the lapped portions having a slot in partial alinement only with a slot in the cooperating lapped portion, and a pin passing through the alined parts of the slots and adapted to travel in the non-alined part of one or the other of the slots in accordance with the expansive force exerted by swelling of the active material.

5. A storage battery comprising an angular casing, supports in said casing carrying active material and forming the entire lateral bounding surfaces of a chamber adapted to receive electrolyte, terminals, and means for electrically connecting the active materials with the terminals.

6. The invention according to claim 5, in which the active material supports are fitted loosely in the casing and are jointed to permit expansion.

In testimony whereof, we affix our signatures.

RAYMOND C. BENNER.
HARRY H. THOMPSON.